United States Patent
Mehrhoff et al.

(10) Patent No.: US 11,842,328 B2
(45) Date of Patent: Dec. 12, 2023

(54) SYSTEMS AND METHODS FOR PROVISIONING A TOKEN TO A TOKEN STORAGE DEVICE

(71) Applicant: MASTERCARD INTERNATIONAL INCORPORATED, Purchase, NY (US)

(72) Inventors: Shawn Mehrhoff, Saint Ann, MO (US); Christopher T. Scholl, Saint Peter's, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/662,968

(22) Filed: Oct. 24, 2019

(65) Prior Publication Data

US 2021/0125164 A1    Apr. 29, 2021

(51) Int. Cl.
*G06Q 20/20* (2012.01)
*G06Q 20/36* (2012.01)
(Continued)

(52) U.S. Cl.
CPC ........... *G06Q 20/20* (2013.01); *G06F 16/252* (2019.01); *G06Q 20/105* (2013.01);
(Continued)

(58) Field of Classification Search
CPC .... G06Q 20/20; G06Q 20/105; G06Q 20/341; G06Q 20/352; G06Q 20/3672; G06Q 20/385; G06Q 20/40; G06F 16/252
See application file for complete search history.

(56) References Cited

U.S. PATENT DOCUMENTS 5,737,423 A * 4/1998 Manduley .......... G06K 19/0723
380/273
6,029,890 A    2/2000 Austin
(Continued)

FOREIGN PATENT DOCUMENTS

WO    WO-2015162276 A2 * 10/2015 ......... G06Q 20/3821
WO    WO-2016049636 A2 *  3/2016 ........... G06F 21/602

OTHER PUBLICATIONS

Garret, "Hybrid Static Contact Smartcard and Dynamic Contactless Smartcard (Hybrid Smartcard)," U.S. Appl. No. 62/849,804, filed May 17, 2019 (Year: 2019).*
(Continued)

*Primary Examiner* — Asfand M Sheikh
(74) *Attorney, Agent, or Firm* — Armstrong Teasdale LLP

(57) ABSTRACT

A token management computing system for provisioning a payment token to a token storage device for a payment transaction is provided. The token management computing system includes a user computing device in communication with the token storage device and a token management server that includes at least one processor communicatively coupled to a memory device. The at least one processor is programmed to (i) receive, from the user computing device, a token request for a payment token, the request including a payment account number (PAN) selected from a digital wallet stored on the user computing device, and at least one token control, (ii) store token information including the PAN and the at least one token control, (iii) generate a single-use payment token, (iv) transmit the token to the user computing device, and (v) instruct the user computing device to transfer the token to the token storage device.

20 Claims, 5 Drawing Sheets

(51) Int. Cl.
  *G06Q 20/10* (2012.01)
  *G06Q 20/34* (2012.01)
  *G06Q 20/38* (2012.01)
  *G06Q 20/40* (2012.01)
  *G06F 16/25* (2019.01)

(52) U.S. Cl.
  CPC ......... *G06Q 20/341* (2013.01); *G06Q 20/352* (2013.01); *G06Q 20/3672* (2013.01); *G06Q 20/385* (2013.01); *G06Q 20/40* (2013.01); *G06Q 2220/00* (2013.01)

(56) References Cited

U.S. PATENT DOCUMENTS

| | | | |
|---|---|---|---|
| 6,163,771 A | 12/2000 | Walker et al. | |
| 6,609,654 B1 | 8/2003 | Anderson et al. | |
| 8,615,468 B2 | 12/2013 | Varadarajan | |
| 9,218,557 B2* | 12/2015 | Spodak | G06K 19/07707 |
| 9,652,770 B1 | 5/2017 | Kurani et al. | |
| 10,037,524 B2 | 7/2018 | Royyuru et al. | |
| 10,354,321 B2 | 7/2019 | Royyuru et al. | |
| 10,706,414 B1* | 7/2020 | Lieberman | G06Q 20/40145 |
| 10,762,506 B1* | 9/2020 | Cash | G06Q 20/206 |
| 11,023,800 B2* | 6/2021 | Garrett | G06Q 20/325 |
| 2002/0023054 A1* | 2/2002 | Gillespie | G06Q 20/12 705/39 |
| 2003/0080183 A1 | 5/2003 | Rajasekaran et al. | |
| 2005/0043997 A1 | 2/2005 | Sahota et al. | |
| 2010/0250290 A1* | 9/2010 | Lefkowitz | G06Q 20/204 705/5 |
| 2013/0030997 A1* | 1/2013 | Spodak | G06Q 20/3572 705/41 |
| 2013/0030998 A1* | 1/2013 | Colley | G06Q 20/18 700/232 |
| 2013/0054336 A1* | 2/2013 | Graylin | G06Q 40/02 705/14.26 |
| 2014/0040139 A1* | 2/2014 | Brudnicki | H04W 12/0471 705/44 |
| 2014/0067675 A1 | 3/2014 | Leyva et al. | |
| 2014/0100973 A1* | 4/2014 | Brown | G06Q 20/3274 705/17 |
| 2014/0114857 A1* | 4/2014 | Griggs | G06Q 40/00 705/44 |
| 2014/0164243 A1 | 6/2014 | Aabye et al. | |
| 2014/0195425 A1* | 7/2014 | Campos | G06Q 20/3674 705/41 |
| 2014/0229379 A1* | 8/2014 | Jang | G06Q 20/385 705/44 |
| 2014/0258010 A1* | 9/2014 | Mardikar | G06Q 20/202 705/21 |
| 2015/0006305 A1* | 1/2015 | Randazza | G06Q 20/02 705/17 |
| 2015/0254647 A1* | 9/2015 | Bondesen | G06Q 20/36 705/41 |
| 2015/0312038 A1* | 10/2015 | Palanisamy | G06Q 20/385 713/155 |
| 2016/0180338 A1* | 6/2016 | Androulaki | H04L 9/3228 705/71 |
| 2016/0224977 A1* | 8/2016 | Sabba | G06Q 20/385 |
| 2016/0267466 A1* | 9/2016 | Kumnick | G07F 7/0806 |
| 2017/0262841 A1* | 9/2017 | Good | G06Q 20/385 |
| 2017/0359358 A1* | 12/2017 | Alattar | G06Q 20/3278 |
| 2018/0108008 A1* | 4/2018 | Chumbley | G06Q 20/3674 |
| 2018/0137498 A1* | 5/2018 | Kim | G06Q 20/3674 |
| 2019/0318345 A1* | 10/2019 | Kallugudde | G06Q 20/3226 |
| 2020/0320524 A1* | 10/2020 | Bhasin | G06Q 20/383 |
| 2021/0125164 A1* | 4/2021 | Mehrhoff | G06Q 20/20 |
| 2021/0287207 A1* | 9/2021 | Williams | G06Q 20/3672 |
| 2023/0214823 A1* | 7/2023 | Bernstein | G06Q 20/385 705/75 |

OTHER PUBLICATIONS

Cao, Yinzhi, Xiang Pan, and Yan Chen. "SafePay: Protecting against credit card forgery with existing magnetic card readers." 2015 IEEE Conference on Communications and Network Security (CNS). IEEE, 2015. (Year: 2015).*

Ahmad, Zubair, Akram M. Zeki, and Akeem Olowolayemo. "Security failures in EMV smart card payment systems." 2016 6th International Conference on Information and Communication Technology for the Muslim World (ICT4M). IEEE, 2016. (Year: 2016).*

Salajegheh, Mastooreh, Bodhi Priyantha, and Jie Liu. "Unleashing the Wild Card for mobile payment." 2014 IEEE International Conference on Pervasive Computing and Communications (PerCom). IEEE, 2014. (Year: 2014).*

* cited by examiner

SYSTEMS AND METHODS FOR PROVISIONING A TOKEN TO A TOKEN STORAGE DEVICE

BACKGROUND

The present application relates generally to secure token transmission from a user computing device to a token storage device, and more specifically, to a system and method for provisioning secure payment tokens to a token storage device for use in card present payment transactions.

On occasion, due to increasing security concerns, a cardholder may be wary of using his or her physical credit card or mobile device (e.g., a smartphone) to pay for in-store purchases at certain locations or merchants. For example, if the cardholder is shopping at a retail chain that has recently reported a big customer data breach, the cardholder may be apprehensive as to whether doing so will compromise their payment credentials. In another example, if the cardholder needs to make a purchase, but is at a large crowded event, such as a music festival, or is passing through a high crime area, the cardholder may be concerned of either losing their smartphone, purse, and/or wallet or having any of these items stolen.

It is well known that credit card scammers target point-of-sale (POS) terminals to steal cardholder data from, for example, magnetic stripes on traditional payment cards by using credit card skimmers. In order to circumvent the security concerns surrounding magnetic stripes, many payment cards are now embedded with security chips. However, as many payment cards are equipped with both magnetic stripes and security chips, credit card scammers are still targeting POS terminals to steal cardholder data from payment cards, even though a cardholder may dip their chip to pay for an in-store purchase. In addition to using credit card skimmers, scammers are known to use credit card shimmers, which unlike credit card skimmers, are placed inside the credit card slot to target customers who pay by dipping their chip-based card. Thus, it appears that credit card skimmers are continuously evolving to try and address anti-fraud security measures.

Newer forms of payment, such as payment with a mobile device using a digital wallet, use unique payment tokens, as opposed to credit card data. In payment tokenization, the customer's primary account number (PAN) is replaced with a stand-in token, which may be a series of randomly-generated numbers. Credit card encryption, on the other hand, does not replace the customer's PAN with a placeholder, but instead encrypts the cardholder data to disguise the PAN into an unreadable code. The code can be decrypted using an encryption key. Tokenization is generally cheaper, easier to use, and more secure than encryption, as in the case of a merchant security breach, meaningless tokens, rather than sensitive payment data is exposed. However, payment tokens are generally only available for use as in-store payments by using a mobile device with a digital wallet, and not where a physical payment card is used.

Accordingly, it is desirable to have a system that enables payment tokens to be used for in-store purchases without the use of mobile devices, and for a cardholder to further address the above security concerns by being able to establish customized controls for using each payment token.

BRIEF DESCRIPTION

In one aspect, a token management computing system for provisioning a secure payment token to a token storage device for a payment transaction is provided. The token management computing system includes a user computing device in communication with the token storage device and a token management ("TM") server. The token storage device is configured to communicate a payment token to a merchant point-of-sale terminal. The TM server includes a memory device for storing data and at least one processor communicatively coupled to the memory device. The at least one processor is programmed to receive, from the user computing device, a token request for a single-use payment token. The token request includes (i) a payment account number (PAN) selected from a digital wallet stored on the user computing device and (ii) at least one token control. The at least one token control includes an amount of value associated with the token request. The at least one processor is also programmed to store token information in a database. The token information includes the PAN selected from the digital wallet and the at least one token control. The at least one processor is also programmed to generate, upon receiving the token request, the single-use payment token. The payment token is linked with the PAN in the database. The at least one processor is also programmed to transmit the generated payment token to the user computing device. The at least one processor is also programmed to instruct the user computing device to transfer the payment token to the token storage device for use at a physical merchant location.

In another aspect, a computer-implemented method for provisioning a secure payment token to a token storage device for a payment transaction using a token management computing system is provided. The token management computing system includes a user computing device in communication with the token storage device and a token management ("TM") server. The TM server includes at least one processor communicatively coupled to a memory device. The token storage device is configured to communicate a payment token to a merchant point-of-sale terminal. The method includes receiving, from the user computing device, at the TM server, a token request for a single-use payment token. The token request includes (i) a payment account number (PAN) selected from a digital wallet stored on the user computing device and (ii) at least one token control. The at least one token control includes an amount of value associated with the token request. The method also includes storing token information in a database. The token information includes the PAN selected from the digital wallet and the at least one token control. The method also includes generating, at the TM server, upon receiving the token request, the single-use payment token. The payment token is linked with the PAN in the database. The method also includes transmitting, by the TM server, the generated payment token to the user computing device. The method also includes instructing, by the TM server, the user computing device to transfer the payment token to the token storage device for use at a physical merchant location.

In yet another aspect, at least one non-transitory computer-readable storage media that includes computer-executable instructions for provisioning a secure payment token to a token storage device for a payment transaction using a token management computing system is provided. The token management computing system includes a user computing device in communication with the token storage device and a token management ("TM") server. The token storage device is configured to communicate a payment token to a merchant point-of-sale terminal. When executed by the TM server, the computer-executable instructions cause the TM server to receive, from the user computing device, a token request for a single-use payment token. The token request includes (i) a payment account number (PAN) selected from a digital wallet stored on the user computing device and (ii) at least one token control. The at least one token control includes an amount of value associated with the token request. The computer-executable instructions further cause the TM server to store token information in a database. The token information includes the PAN selected from the digital wallet and the at least one token control. The computer-executable instructions further cause the TM server to generate, upon receiving the token request, the single-use payment token. The payment token is linked with the PAN in the database. The computer-executable instructions further cause the TM server to transmit the generated payment token to the user computing device. The computer-executable instructions further cause the TM server to instruct the user computing device to transfer the payment token to the token storage device for use at a physical merchant location.

BRIEF DESCRIPTION OF THE DRAWINGS

FIG. 1 is a flow diagram illustrating an example process for communicating a payment token to a token storage device using an example token management ("TM") computing system.

FIG. 2 is a flow diagram illustrating a purchase transaction through a payment card processing network using the token storage device shown in FIG. 1.

FIG. 3 is an example purchase environment illustrating using a user computing device to load a token generated by the TM server onto the token storage device for use at a physical merchant location, as shown in FIG. 1.

FIG. 4 illustrates an example configuration of a token management ("TM") server of the token management ("TM") computing system, as shown in FIG. 1.

FIG. 5 is a diagram of components of one or more example computing devices that may be used in the token management ("TM") computing system shown in FIG. 1.

Figure 1:
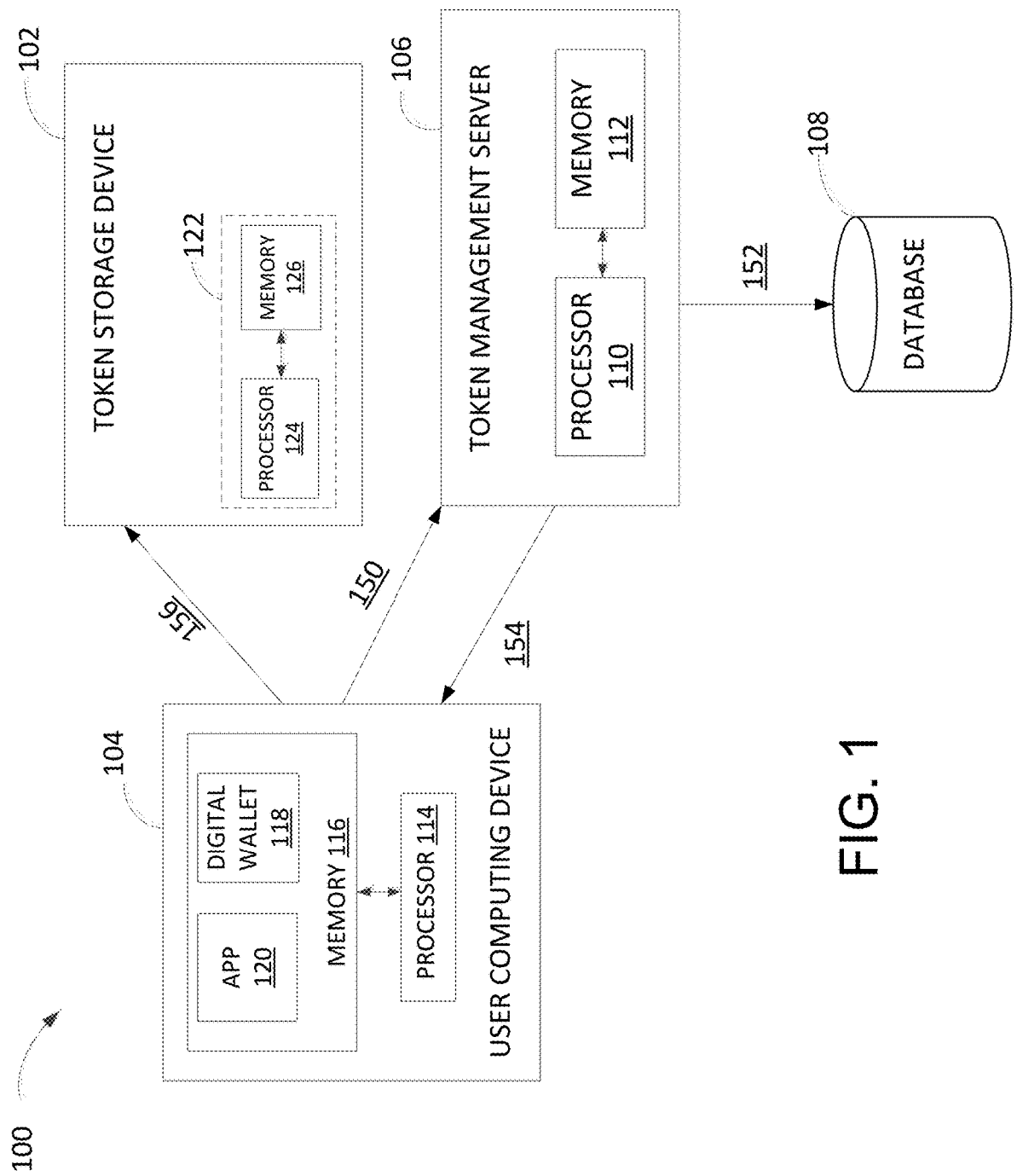
FIGS. 1-5 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The systems and methods described herein are directed to provisioning a secure payment token from a user computing device onto a token storage device for use at a physical merchant location. Specifically, payment tokens are generated for in-person transactions. The token storage device is a portable device such as, for example, a fob or a card having rewritable data storage capabilities. In one example embodiment, the systems and methods may be performed by a token management ("TM") server.

The token management ("TM") computing system enables users to conduct token-based transactions using token storage devices for card present transactions. The TM computing system enables a user to set one or more token controls to define appropriate usage of a requested token. By enabling a user to set one or more token controls, such as a total spend limit associated with a token, the TM computing system facilitates fraud prevention. More specifically, the TM computing system facilitates fraud prevention by providing multiple layers of security to protect a user's payment credentials. Rather than simply encrypting a user's payment account number (PAN), the TM computing system is configured to generate temporary PANs on a per-transaction basis. The TM computing system is further configured to tokenize the temporary PAN (hereinafter referred to as "token"), and transmit this token to a user for use at a physical merchant location.

In the example embodiment, the TM computing system includes a user computing device (e.g., a mobile device) associated with a user, a token management ("TM") server, a database, and a token storage device. The user computing device includes a digital wallet (e.g., mobile wallet, e-wallet) and an app (e.g., software application) provided by the TM server. The app is configured enable the user to activate the token storage device to load (e.g., communicate, transfer, transmit) a secure payment token onto the token storage device. The token storage device includes an embedded microchip configured to receive the payment token from the user computing device. The embedded microchip may be an EMV® chip (EMV is a registered trademark of EMVCo, LLC, Foster City, CA). In the example embodiment, the token storage device does not have a magnetic stripe. In some embodiments, the embedded microchip is configured to provide an additional layer of security by encrypting the received payment token. Thus, in these embodiments, the token storage device communicates an encrypted payment token to a merchant (e.g., a merchant point-of-sale (POS) terminal) during an in-store payment transaction.

During an in-store payment transaction, the token storage device is configured to communicate the secure payment token to the merchant (e.g., the merchant point-of-sale terminal) by tapping or dipping the token storage device. The merchant POS terminal may be configured to read EMV chips, and enable contactless payments, via, for example, Near Field Communication (NFC).

To activate the token storage device and load a secure payment token thereon, a user submits a token request to the TM server via the app. When the user accesses the app on the user's user computing device, the app may prompt the user to select a payment account number (e.g., PAN) from the user's digital wallet. This payment account number may be referred to herein as "original PAN," and "funding account number." The token request further includes one or more token controls. In the example embodiment, the token request includes a total spend limit (e.g., an amount of value) as a token control. Additional token controls may include a designated period of time associated with using the requested token. For example, the user may set an expiration date of one week from the date of receiving the token. In this example, if the user does not use the requested token within the selected time frame, the requested token automatically deactivates, and cannot be used as payment in an in-store payment transaction. In other embodiments, the TM server may automatically apply an expiration date to the requested token as a security precaution if a user does not provide an expiration date. For example, the TM server may deactivate the payment token one month or a year from the requested date if the user has not loaded the requested token onto the token storage device and/or has not used the requested token within this allotted time frame.

Additional token controls may also include a number of transactions associated with the requested token. In some embodiments, the user can request a token for a single transaction (e.g., one-time token, single-use token). In another embodiment, the user can request a token for multiple transactions (e.g., multi-use token). In this embodiment, the user may be prompted to input a number of transactions for the requested multi-use token. For example, the token request may specify (i) a total spend limit of $50 and (ii) a transaction limit of four payment transactions to apply to a requested token. In one embodiment, the user may designate specific merchant categories for making purchases using the requested token. In this embodiment, the TM server may provide a list of merchant categories or otherwise prompt the user to input specific merchant categories to limit where the requested token can be used.

For example, the token request may specify that transactions associated with the requested token are to be limited to grocery stores and supermarkets as well as gas/service stations. In another embodiment, the TM server may enable the user to specify merchant categories for where the requested token may not be used. For example, the token request may include a spend control specifying that the requested token can be used to make purchases in any merchant category except merchant categories associated with package stores, beer, wine, and liquor. In these embodiments, a parent submitting a token request to enable their teenage child to use the token storage device may apply additional token controls, such as those discussed above, to limit merchant locations where the child can use the token storage device. In other embodiments, the TM server may enable a user to provide, in the token request, a physical merchant location, a retail chain, a restaurant chain, or an address (e.g., airport) at which the requested token may be used.

By enabling a user to set, at the outset, token controls associated with a requested token, the TM server enables a user to make purchases at physical merchant locations where security may be compromised (e.g., credit card skimmers, camera cover PIN stealers) without putting the credit card holder's information at risk. For example, if a user's mobile device is an expensive smart phone, and the user is traveling through a high-crime area known for reoccurring issues with card skimmers, the user may be apprehensive about using his or her smart phone and/or physical credit card to conduct a payment transaction. In this example, the user may access the app to transmit a token request to the TM server. The user can designate, in the token request, a total spend limit associated with the token.

In this example, the user can use his or her mobile device to load, onto the token storage device, a secure payment token for one-time use at a gas station before the user leaves his or her vehicle. The user may specify, in the token request, a total spend limit of $30 to be applied. The user may then safely put away his or her expensive smart phone in the vehicle, and proceed to use the token storage device at a card reader at the gas pump or inside the gas station.

The technical effects achieved by the systems and methods described herein include enabling secure payment tokens to be used for in-store purchase transactions without requiring a user computing device, and providing multiple layers of security on a per-transaction basis, thereby providing heightened protection with respect to a credit card holder's payment credentials. By furnishing a user with a token storage device that is configured to store tokens as opposed to the user's personal identifying information, such as a personal account number (PAN), the credit card holder's payment credentials are protected even in the event the token storage device is lost or stolen. Further, by enabling a user to establish token controls for each requested token on a per-transaction basis, the TM computing system not only generates customized payment tokens for use by the user, but also monitors each transaction for fraud in accordance with a variety of user-set token controls. The TM computing system described herein is configured to process token requests in real time (or near real time) to provision secure payment tokens to the user in real time.

The methods and systems directed to the token management computing system described herein may be implemented using computer programming or engineering techniques including computer software, firmware, hardware or any combination or subset thereof, wherein the technical effect may be achieved by performing at least one of the following steps: (a) receiving, from a user computing device, a token request for a single-use payment token, the token request including (i) a payment account number (PAN) selected from a digital wallet stored on the user computing device, and (ii) at least one token control, wherein the at least one token control includes an amount of value associated with the token request, (b) storing token information in a database, the token information including the PAN selected from the digital wallet and the at least one token control, (c) generating, at the TM server, upon receiving the token request, the single-use secure payment token, wherein the payment token is linked with the PAN in the database, (d) transmitting, by the TM server, the generated payment token to the user computing device, and (e) instructing, by the TM server, the user computing device to transfer the secure payment token to the token storage device for use at a physical merchant location.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing a token management ("TM") computing system for provisioning secure payment tokens to a token storage device for use in card present payment transactions between customers and merchants, thus providing an alternative to using a mobile device or an issued payment card for in-store purchases.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

FIG. 1 is a flow diagram illustrating an example process for provisioning a secure payment token from a user computing device 104 to a token storage device using an example token management ("TM") computing system 100. In particular, FIG. 1 depicts the flow of data for activating a token storage device 102 by utilizing user computing device 104 associated with a user. In the example embodiment, TM computing system 100 includes user computing device 104, a token management ("TM") server 106, a database 108, and a token storage device 102. TM server 106 includes at least one processor 110 in communication with a memory 112. Additionally or alternatively, memory 112 may include database 108 and/or a database server (not shown).

In the example embodiment, user computing device 104 is in communication with token management server 106 and token storage device 102. User computing device 104 includes at least one processor 114 in communication with a memory 116. Memory 116 stores a digital wallet (e.g., mobile wallet, e-wallet) 118 and an app 120 (e.g., software application) provided to user computing device 104 by TM server 106. In the example embodiment, app 120 is in communication with digital wallet 118. App 120 is configured to enable a user to activate token storage device 102. More specifically, processor 114 of user computing device 104 executes app 120 to communicate (e.g., load, transfer, transmit) a secure payment token 156 received from TM server 106 to token storage device 102. In the example embodiment, payment token 156 is a tokenized temporary PAN that is generated by TM server 106 for a single transaction. In some embodiments, secure payment token 156 may be for a limited number of transactions specified by the user.

Token storage device 102 includes an embedded microchip (e.g., integrated circuit chip) 122. Embedded microchip 122 includes at least one processor 124 in communication with a memory 126. In the example embodiment, microchip 122 is configured to receive one or more payment tokens 156 from user computing device 104 and securely store the token(s) 156 within memory 126 of token storage device 102. Token storage device 102 may also have a radio frequency (RFID) antenna to enable contactless payments via, for example, near field communication (NFC). Token storage device 102 may take the form of a physical payment card. In other embodiments, token storage device 102 may take the form of a key fob.

In the example embodiment, embedded microchip 122 is configured to securely store received payment token 156 and communicate token 156 to a merchant POS terminal, such as POS terminals 302 and 304 (shown in FIG. 3) as payment during a payment transaction at a merchant location. In some embodiments, microchip 122 is configured to provide an additional layer of security by encrypting payment token 156. In these embodiments, microchip 122 stores encrypted payment token 156 in memory 126, and transmits encrypted payment token 156 to a merchant POS terminal, such as POS terminals 302 and 304 when the user initiates a payment transaction at the merchant location.

To activate token storage device 102 for use at a physical merchant location, a user submits a token request 150 to TM server 106 via app 120. In the example embodiment, token request 150 includes a payment account number (PAN) and a spend limit (e.g., an amount of value) to apply to a requested token 156. App 120 may prompt the user to select a PAN stored in digital wallet 118. Token request 150 may include additional information, including, but not limited to, a device identifier associated with user computing device 104, a user identifier registered with app 120 (such as a user email address and/or user account identifier registered with app 120), a time stamp (e.g., date and time) associated with token request 150, and location data associated with user computing device 104 at the time of transmitting token request 150 (e.g., geographic coordinates, geographic area, zip code).

In addition to a spend limit, token request 150 may include additional token controls (e.g., user specified conditions, parameters, spend controls) to apply to requested token 156. Additional spend controls may include a designated period of time associated with using requested token 156. The user may provide an expiration date and/or time to apply to requested token 156. In other embodiments, TM server 106 may automatically apply an expiration date to requested token 156 as a security precaution if a user does not provide an expiration date. Additional token controls may also include a limited number of transactions associated with requested token 156, such as a single-use token or a multi-use token. Token controls may further include one or more merchant categories.

In the example embodiment, TM server 106 receives token request 150 from user computing device 104, and proceeds to generate token 156. More specifically, TM server 106 generates token 156 by (i) generating a temporary PAN associated with the token request 150, and (ii) tokenizing the temporary PAN. Thus, by generating a temporary PAN and further tokenizing the temporary PAN, TM server 106 provides layers of security in the event a merchant is hacked and customer payment information is compromised. In some embodiments, TM server 106 validates the original PAN (e.g., funding account number) received in token request 150 with the user's credit card issuer, such as issuer 204 (shown in FIG. 2). In these embodiments, TM server 106 proceeds to generate token 156 only after validating the PAN with the user's issuer.

After generating token 156, TM server 106 stores token information 152 regarding generated token 156 in database 108. In particular, token information 152 includes data regarding the relationship between the user and generated token 156 in database 108. In the example embodiment, the spend controls provided by the user in token request 150 are stored in database 108 and associated with generated token 156, such that the spend controls may be referenced and applied by TM server 106 when the user initiates a payment transaction using token storage device 102. TM server 106 may generate a user profile that includes information received in token request 150 as well as generated token 156. The user profile can be stored in database 108. Information stored at database 108 may also include a device identifier associated with token storage device 102.

In the example embodiment, TM server 106 subsequently transmits a token response message 154 to user computing device 104. In the example embodiment, token response message 154 includes generated token 156 as well as instructions regarding provisioning token 156 to token storage device 102. App 120 may notify the user of received token 156. For example, app 120 may be programmed to display a notification on user computing device 104 indicating that token 156 has been received on user computing device 104. App 120 stores token 156 in memory 116 of user computing device 104.

In the example embodiment, user computing device 104 extracts token 156 from token response message 154 and transmits token 156 to token storage device 102 in accordance with the instructions received from TM server 106 in token response message 154. TM server 106 may instruct user computing device 104 to automatically (without further input from user) transfer token 156 to token storage device 102. In further embodiments, TM server 106 may instruct user computing device 104 to transfer token 156 to token storage device 102 upon receiving a user input from the user. For example, app 120 may be programmed to prompt the user to select a "transfer token to card" option. In this example, user computing device 104 provisions token 156 to token storage device 102 upon receiving this user input. In these embodiments, token 156 may be stored in memory 116 of user computing device 104 for a limited period of time (e.g., a couple of days) until the user initiates transfer of token 156 from user computing device 104 to token storage device 102.

Upon transferring token 156 to token storage device 102, token 156 is stored in memory 126 of embedded microchip 122. In some embodiments, upon receiving token 156 from user computing device 104, token storage device 102 encrypts token 156 and stores encrypted token 156 in memory 126 of embedded microchip 122. This encryption (e.g., cryptography) process is provided by embedded microchip 122 as an additional security measure to further encrypt the tokenized temporary PAN (e.g., the token) in the event of a customer data breach at one or more merchant locations where token storage device 102 is used. Once token 156 is stored in memory 126 of embedded microchip 122, token storage device 102 is ready to be used at a physical merchant location.

Figure 2:
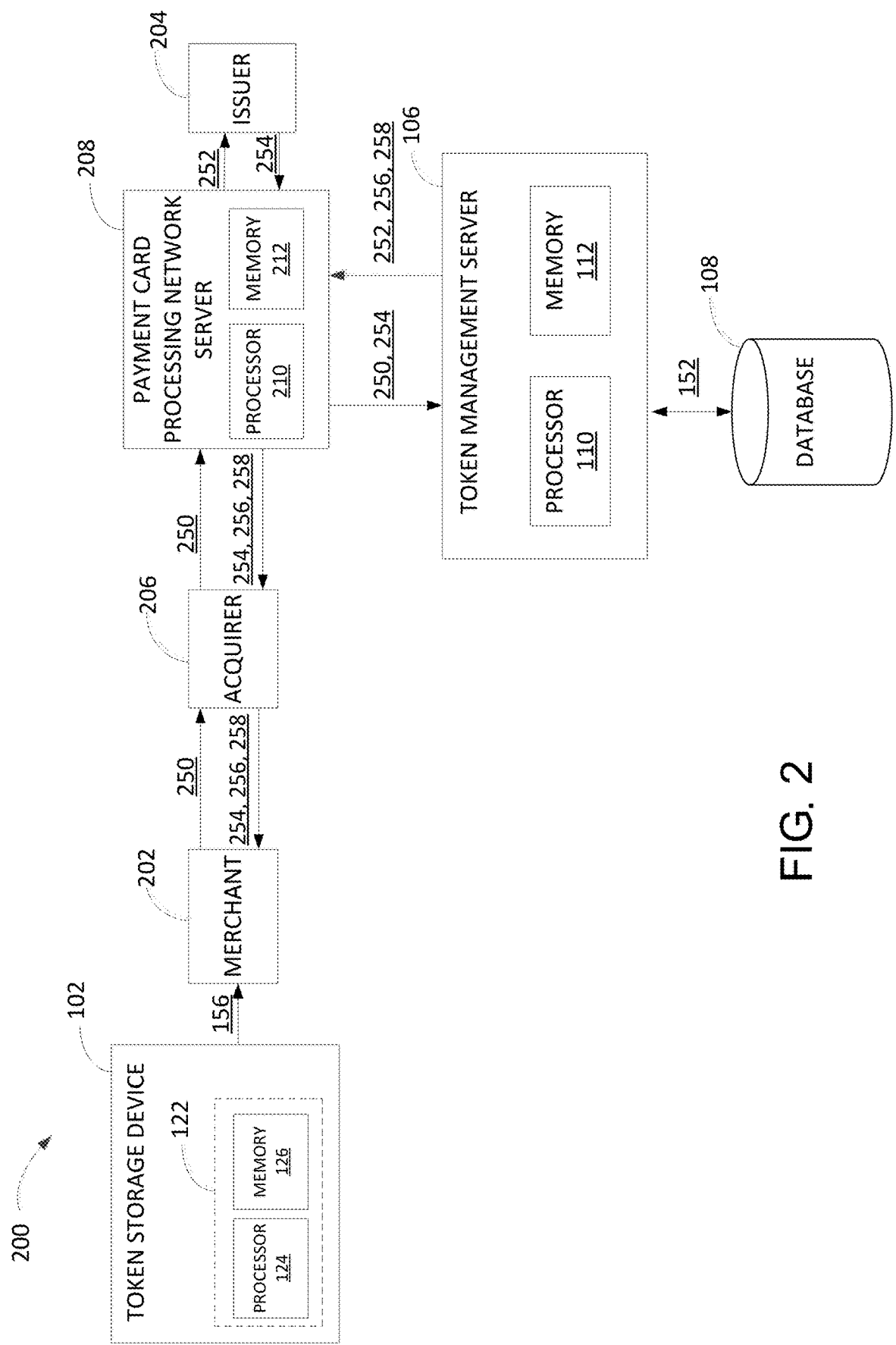
Figure 3:
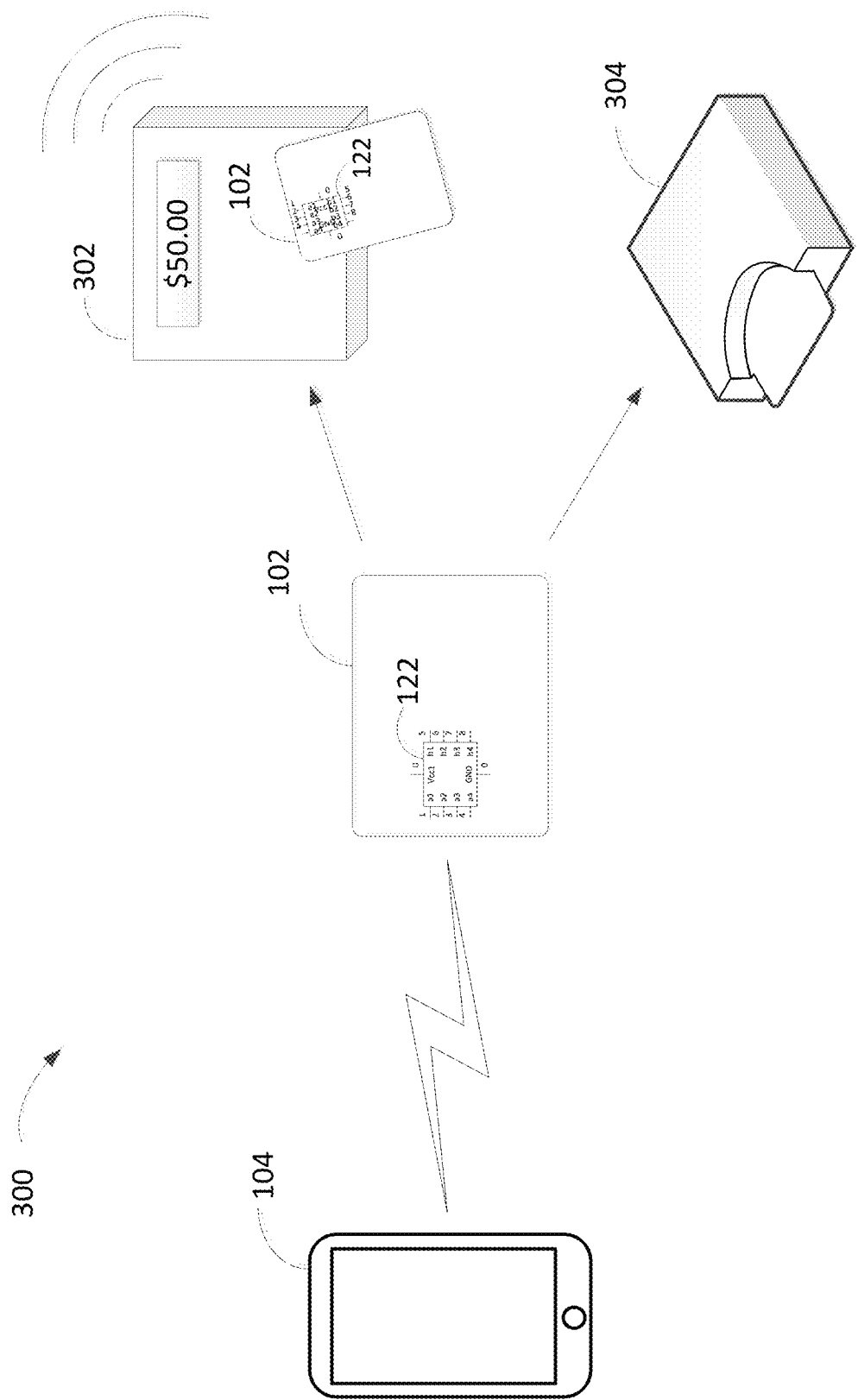

FIG. 2 is a flow diagram illustrating an example purchase transaction 200 through a payment card processing network using token storage device 102 (shown in FIG. 1). FIG. 3 is an example purchase environment 300 illustrating using user computing device 104 to load a token generated by TM server 106 onto token storage device 102 for use by a customer at a physical merchant location (all shown in FIG. 1). In the example embodiment, a user loads a token, such as token 156 (shown in FIG. 1) onto token storage device 102 using user computing device 104, as discussed above with respect to FIG. 1.

User computing device 104 may communicate token 156 to token storage device 102 via wireless communication, for example, via an IEEE 802.11 wireless local area network. User computing device 104 may communicate token 156 to token storage device 102 using a mobile phone network associated with user computing device 104, such as Global System for Mobile communications (GSM), 3G, 4G Bluetooth or other mobile data network (e.g., Worldwide Interoperability for Microwave Access (WIMAX)). The user may or may not be the customer using token storage device 102 to make a purchase at the physical merchant location. For example, the customer may be an authorized credit card user or a family member (e.g., child, spouse, relative) associated with the user.

In the example embodiment, the customer uses token storage device 102 during checkout to communicate a token 156 as payment to a merchant 202 during a payment transaction. Token storage device 102 is configured for use at a physical merchant location equipped with a point-of-sale (POS) terminal capable of processing chips, such as embedded microchip 122. As shown in FIG. 3, merchant 202 can have a contactless POS terminal 302, which enables the user to pay via NFC by tapping token storage device 102 on POS terminal 302. Additionally or alternatively, merchant 202 may have a contact POS terminal 304, which enables the user to pay by dipping token storage device 102 in a chip reader slot available on contact POS terminal 304.

In purchase environment 300, as shown in FIG. 3, token storage device 102 takes the form of a payment card. In purchase environment 300, token storage device 102 does not include a magnetic stripe, as seen in traditional payment cards, as magnetic stripes make it easier to put customer card information at risk. Rather, token storage device 102 only has embedded chip 122. Embedded chip 122 may be an EMV chip. In these embodiments, contactless POS terminal 302 and contact POS terminal 304 are equipped with EMV card readers.

Payment card processing network server 208 is part of the payment card processing network, such as the Mastercard® credit card payment network. The Mastercard® payment processing network is a proprietary communications standard promulgated by Mastercard International Incorporated® for the exchange of financial transaction data between financial institutions that are registered with Mastercard International Incorporated®. (Mastercard is a registered trademark of Mastercard International Incorporated located in Purchase, New York). In the payment card processing network, an issuer 204, typically a financial institution such as an issuing bank, issues a payment card, such as a credit card account or a debit card account, to a customer, who uses the payment card to tender payment for a purchase from a merchant 202. To accept payment with the payment card, merchant 202 must normally establish an account with a financial institution that is part of the financial payment system. This financial institution is usually called the "merchant bank" or the "acquiring bank" or simply "acquirer" 206.

In the example embodiment, merchant 202 receives a token 156 (e.g., the tokenized temporary PAN) as the customer's payment information when the customer uses token storage device 102 for payment, rather than the customer's real PAN issued by issuer 204. Merchant 202 subsequently transmits an authorization request message 250 including token 156 to acquirer 206 over the payment card processing network. More specifically, when the user tenders payment for a purchase with token storage device 102, merchant 202 requests authorization from acquirer 206 for the amount of the purchase. The request is performed through the use of a POS terminal, as described above, which reads the user's payment information, the token, from embedded chip 122, and communicates electronically with the transaction processing computers of acquirer 206. Alternatively, acquirer 206 may authorize a third party to perform transaction processing on its behalf. In this case, the POS terminal will be configured to communicate with the third party. Such a third party is usually called a "merchant processor," an "acquiring processor," or a "third party processor."

Acquirer 206 transmits authorization request message 250 to payment card processing network server 208. In the example embodiment, payment card processing network server 208 is associated with and/or integral to the payment card processing network. In the example embodiment, authorization request message 250 is formatted according to ISO 8583 network messaging protocol or the equivalent messaging protocol used by the payment card processing network, thus ensuring that token management computing system 100 functions in concert with legacy payment card processing network systems. In the example embodiment, payment card processing network server 208 recognizes that authorization request message 250 contains a token, such as generated token 156, instead of a PAN, and subsequently routes authorization request message 250 to TM server 106. For example, payment card processing network server 208 checks the PAN field of authorization request message 250 to determine if the PAN can be routed to issuer 204. In this example, instead of finding a series of numbers that correspond to a PAN in the PAN field, payment card processing network server 208 may determine that the series of numbers in the PAN field correspond to a token. Payment card processing network server 208 may subsequently route authorization request message 250 to TM server 106 instead of directly onto issuer 204.

Payment card processing network server 208 includes at least one processor 210 for executing instructions and a memory 212 in communication with the at least one processor 210 for storing the executable instructions. Processor 210 may include one or more processing units (e.g., in a multi-core configuration). Memory 212 is any device allowing information such as executable instructions and/or other data to be stored and retrieved. Memory 212 may include one or more computer-readable media. Processor 210 is operatively coupled to a communication interface (not shown) such that payment card processing network server 208 is capable of communicating with remote computing devices, such as acquirer 206, issuer 204, TM server 106, or another server computing device. Processor 210 also is operatively coupled to a database interface (not shown) such that payment card processing network server 208 is capable of communicating with a database.

In the example embodiment, upon determining that authorization request message 250 contains token 156, payment card processing network server 208 transmits token 156 in authorization request message 250 to TM server 106. TM server 106 is configured to perform PAN mapping, and translate token 156 to the funding account number (e.g., original PAN issued by issuer 204) as recognized by issuer's 204 computing systems. More specifically, TM server 106 uses token 156 from authorization request message 250 to retrieve token information 152 stored in database 108 (all shown in FIG. 1). In particular, TM server 106 retrieves token information 152, including the funding account number and the spend controls provided by user in token request 150 (as shown in FIG. 1). In some embodiments, TM server 106 uses token 156 to retrieve, from database 108, a user profile associated with the user.

As discussed above, in the example embodiment, the spend controls include at least a transaction amount limit associated with the token. TM server 106 applies each of the retrieved spend controls to the transaction identified in authorization request message 250 to determine whether all of the predefined spend controls have been met. For example, if in token request 150, the user set the transaction amount limit to $50 for a one-time use token, TM server 106 is configured to apply the spend controls to the transaction, and determine whether to (i) forward authorization request message 250 onto issuer 204 or (ii) deny authorization and decline the transaction.

In the above example, if the total transaction amount is less than or equal to $50, and all the other spend controls (if any) are met, TM server 106 is configured to replace token 156 in the PAN field of authorization request message 250 with the original PAN. In the example embodiment, when TM server 106 determines that all of the spend controls are met, TM server 106 transmits an updated authorization request message 252, including the original PAN, to issuer 204 for authorization. In some embodiments, both the original PAN as well as token 156 are included in updated authorization request message 252 transmitted to issuer 204. In the example embodiment, issuer 204 transmits an authorization response message 254 indicating approval of the subject payment transaction to payment card processing network server 208. In the example embodiment, authorization response message 254 is formatted according to ISO 8583 network messaging protocol or the equivalent messaging protocol used by the payment card processing network.

In some embodiments, payment card processing network server 208 recognizes that authorization response message 254 is associated with a token, such as generated token 156, and transmits authorization response message 254 to TM server 106. In these embodiments, TM server 106 performs a look up in database 108 to find the token that corresponds to the original PAN for this particular transaction. TM server 106 subsequently replaces the PAN with the token in authorization response message 254 and transmits an updated authorization response message 258 to acquirer 206 through payment card processing network server 208. In embodiments where authorization response message 254 includes both the original PAN and the token, TM server 106 removes the PAN from authorization response message 254. In other embodiments, TM server 106 can update database 108 to include details regarding authorization response message 254, specifying that issuer 204 indicated approval of the transaction.

After performing any suitable processing operations, payment card processing network server 208 subsequently transmits authorization response message 254 or updated authorization response message 258 to acquirer 206, and the available credit line or available account balance of the cardholder account is decreased. Acquirer 206 transmits transaction approval 254, 258 directly to merchant 202 (such as to a merchant POS terminal), notifying merchant 202 that the transaction has been authorized. Merchant 202 subsequently provides to the customer, the good or service purchased by the customer to complete the payment transaction. In the example embodiment, to minimize exposure of the funding account number at each stage of the processing the payment transaction, authorization response message 254 does not include the funding account number (e.g., the original PAN). Rather, where applicable, authorization response message 254 includes reference to the token generated by TM server 106.

In events where TM server 106 determines that one or more of the spend controls are not met, TM server 106 rejects authorization of the transaction. More specifically, TM server 106 automatically transmits, to acquirer 206, a transaction decline message 256 declining the transaction. For example, in the event someone steals token storage device 102 and attempts to use it at a physical merchant location, TM server 106 can immediately deny the transaction by applying one or more spend controls stored in database 108. In this example, the person who stole token storage device 102 attempts to purchase an item for $1000 at an electronics store. However, the spend control defines (i) a transaction amount limit of $30 for a (ii) one-time transaction at a gas station (iii) located within a specific zip code. Accordingly, TM server 106 can determine, from applying the spend controls to the attempted purchase transaction, that the transaction should be denied because the transaction (a) exceeds the $30 spend limit, (b) is for a good or service associated with an unauthorized merchant category, and (c) is outside the zip code set by the user.

In the example embodiment, TM server 106 is configured to automatically deny transactions that do not meet all of the predefined spend controls without forwarding a message, such as updated authorization request message 252 to issuer 204. Acquirer 206 transmits transaction decline message 256 to merchant 202 (such as to a merchant POS terminal), notifying merchant 202 that the transaction has been declined. In some embodiments, upon denying a transaction, TM server 106 generates and transmits a notification message to user computing device 104 to alert the user. In some embodiments, TM server 106 updates database 108 to include details regarding transaction decline message 256, specifying denial of authorization and the reasons for doing so.

Normally, a charge is not posted immediately to the cardholder account because bankcard associations, such as Mastercard International Incorporated®, have promulgated rules that do not allow a merchant to charge, or "capture," a transaction until goods are shipped or services are delivered. When merchant 202 ships or delivers the goods or services, merchant 202 captures the transaction by, for example, appropriate data entry procedures on the POS terminal. If the customer cancels a transaction before it is captured, a "void" is generated. If the customer returns goods after the transaction has been captured, a "credit" is generated. Payment card processing network server 208 and/or issuer 204 stores the transaction data, such as a category of merchant, a merchant identifier, a location where the transaction was completed, amount of purchase, date and time of transaction in a database.

A clearing process transfers transaction data related to the purchase among the parties to the transaction, such as acquirer 206, payment card processing network server 208, and issuer 204. No money is exchanged during the clearing process. Clearing involves the exchange of data required to identify the cardholder account such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated®, which identifies that specific transaction. When issuer 204 receives this data, it posts the amount of sale as a draw against the available credit of the cardholder account and prepares to send payment to the acquirer 206.

After a transaction is captured, the transaction is settled between merchant 202, acquirer 206, and issuer 204. Settlement refers to the transfer of financial data or funds between the merchant's account, acquirer 206, and issuer 204 related to the transaction. Usually, transactions are captured and accumulated into a "batch," which is settled as a group. More specifically, a transaction is typically settled between issuer 204 and payment card processing network server 208, and then between payment card processing network server 208 and acquirer 206, and then between acquirer 206 and merchant 202.

Figure 4:
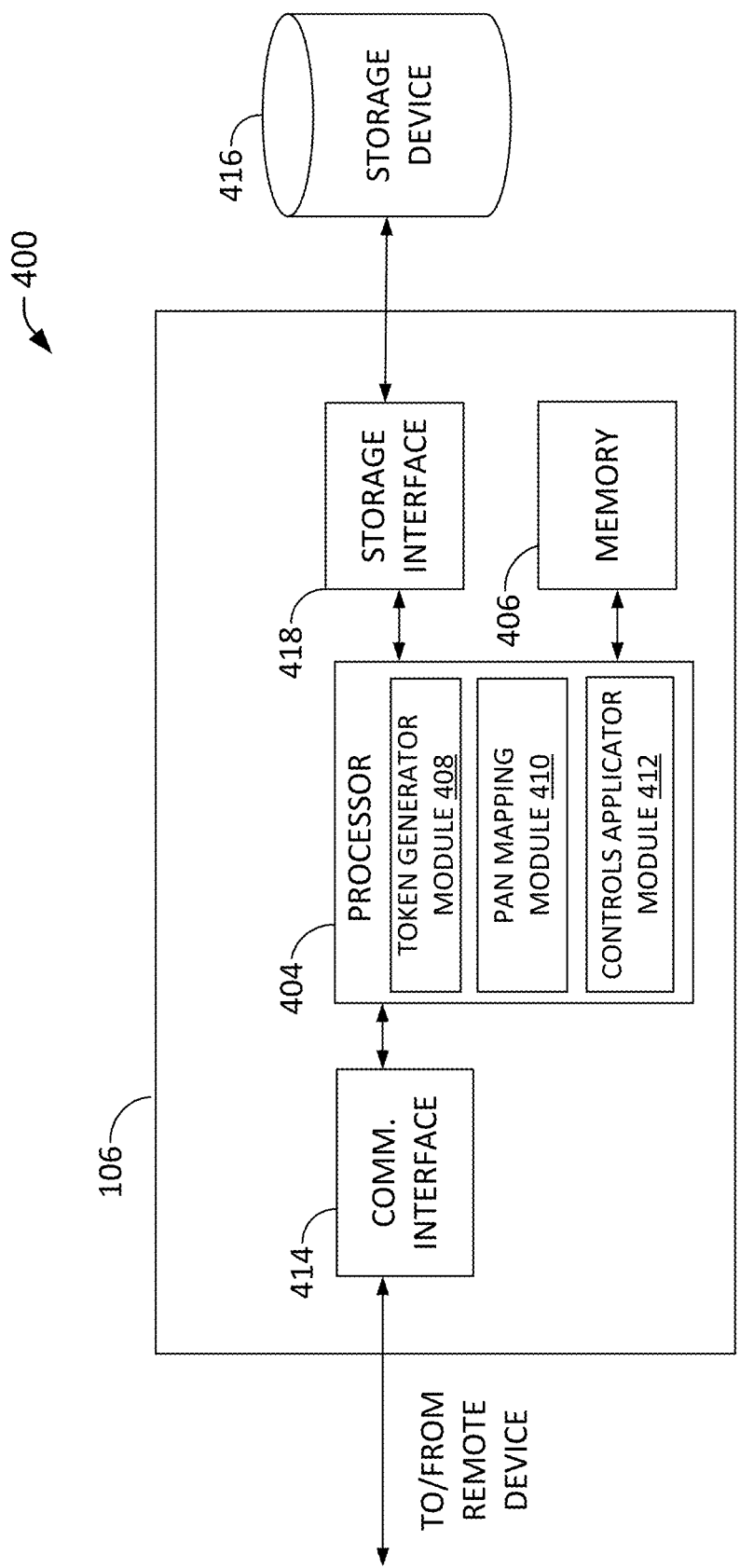

FIG. 4 illustrates an example configuration 400 of a token management (TM") server 106 (shown in FIG. 1) in accordance with one embodiment of the present disclosure. TM server 106 includes a processor 404 for executing instructions. Instructions may be stored in a memory area 406, for example. Processor 404 may include one or more processing units (e.g., in a multi-core configuration) configured to generate a secure payment token for use on a token storage device 102 (both shown in FIG. 1).

In the exemplary embodiment, processor 404 is operable to execute modules, such as token generator module 408, PAN mapping module 410, and controls applicator module 412. Modules 408, 410, and 412 may include specialized instruction sets and/or coprocessors. In the example embodiment, token generator module 408 is utilized to generate one or more secure payment tokens in accordance with a token request, such as token request 150 (shown in FIG. 1) submitted by a user. In the example embodiment, mapping module 410 is utilized to map a token, such as token 156 back to the original PAN for which generated token 156 corresponds to (all shown in FIG. 2). Mapping module 410 may be utilized to retrieve token information 152 associated with token request 150 from database 108 to identify the original PAN (e.g., the funding account number) issued by issuer 204 (all shown in FIG. 2). In the example embodiment controls applicator module 412 is utilized to apply the spend controls associated with token 156 to the transaction data included in authorization request message 150. Controls applicator module 412 enables TM server 106 to determine whether to either (i) update authorization request message 150 with the original PAN and transmit the message to issuer 204 for approval, or (ii) decline the transaction, and transmit transaction decline message 256 to acquirer 206 via payment card processing network server 208 (all shown in FIG. 2).

Processor 404 is operatively coupled to a communication interface 414 such that TM server 106 is capable of communicating with a remote device such as one or more user computing devices 104 (shown in FIG. 1). For example, communication interface 414 may receive a token request, such as token request 150 from user computing device 104, requesting for a one-time use token to load onto token storage device 102 (all shown in FIG. 1).

Processor 404 may also be operatively coupled to a storage device 416. Storage device 416 is any computer-operated hardware suitable for storing and/or retrieving data. For example, database 108 may be implemented on storage device 416. In some embodiments, storage device 416 is integrated in TM server 106. For example, TM server 106 may include one or more hard disk drives as storage device 416. In other embodiments, storage device 416 is external to TM server 106 and may be accessed by a plurality of server computing devices. For example, storage device 416 may include multiple storage units such as hard disks or solid state disks in a redundant array of inexpensive disks (RAID) configuration. Storage device 416 may include a storage area network (SAN) and/or a network attached storage (NAS) system.

In some embodiments, processor 404 is operatively coupled to storage device 416 via a storage interface 418. Storage interface 418 is any component capable of providing processor 404 with access to storage device 416, such that PAN mapping module 410 and controls applicator module 412 are capable of communicating with database 108 (shown in FIG. 1). Storage interface 418 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 416.

Memory area 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 5:
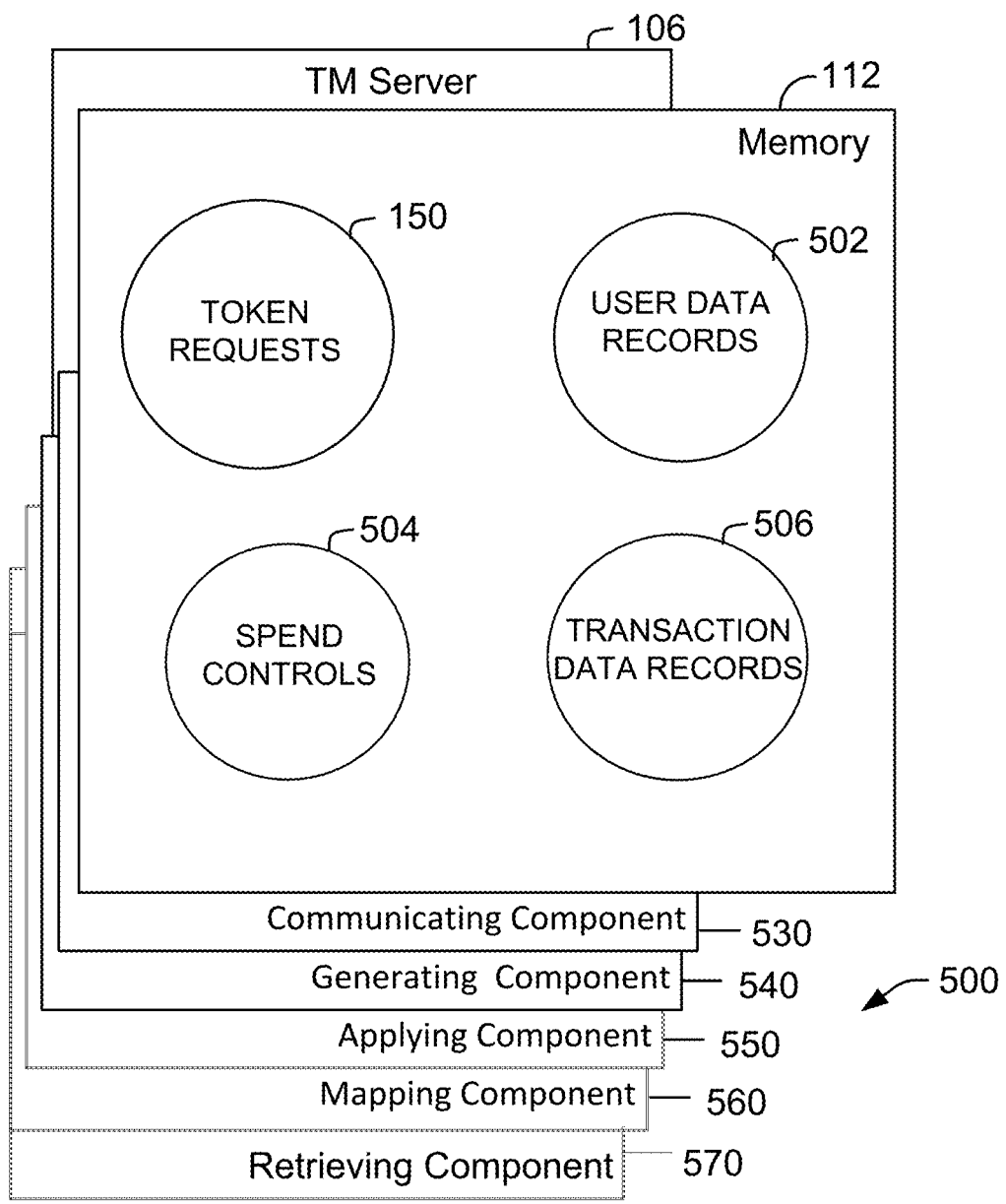

FIG. 5 depicts a diagram of components 500 of one or more example computing devices, such as TM server 106 that may be used in token management ("TM") computing system 100 (all shown in FIG. 1). TM server 106 includes memory 112 configured to store various information which may be obtained from communication with, for example, database 108 and user computing device 104 (shown in FIG. 1). Memory 112 may be coupled with several separate components within TM server 106 which perform specific tasks. In the illustrated embodiment, memory 112 is divided into a plurality of sections and stores, including but not limited to, token requests 150, token data records 502, spend controls 504, and transaction data records 506.

With reference to FIGS. 1-4, in the example embodiment, components 500 include a communicating component 530 configured to receive token requests 150 from user computing devices 104, and transmit token response messages 154 containing tokens 156 to user computing devices 104. Communication component 530 is further configured to receive tokens in authorization request messages 250 from payment card processing network server 208, and transmit updated authorization request messages 252 and transaction decline messages 256.

Components 500 further include a generating component 540 configured to generate tokens, such as tokens 156. Generating component 540 is further configured to generate user notifications and alerts. Components 500 also include an applying component 550 configured to apply spend controls 504 received in token requests 150 to transactions using generated tokens 156. Spend controls 504 include, for example, transaction amount limits and merchant categories associated with each generated token 156. Components 500 also include a mapping component 560 configured to identify the original PAN (e.g., funding account number) associated with token 156. TM server 106 may utilize mapping component 560 to retrieve token requests 150 and/or user data records 502 to map token 156 to its original PAN. User data records 502 include user information, such as a device identifier associated with token storage device 102, a user identifier registered with TM server 106, a user email address and/or contact information registered with TM server 106, historical data detailing the number of times a user associated with a specific user identifier submitted token requests 150 within a period of time, and historical transaction information detailing merchant locations and/or merchant categories at which a user's requested tokens 156 were used.

Components 500 may further include a retrieving component 570 to retrieve token information 152, token requests 150, spend controls 504, and user data records 502 from database 108 to generate tokens and apply spend controls 504 to transaction data in authorization request messages 250. In some embodiments, TM server 106 may utilize retrieving component 570 to retrieve transaction data records 506 associated with tokens 156 to determine a pattern of token usage associated with a user and/or to transmit notifications to the user. Transaction data records 506 include data associated with transaction approvals and transaction declines associated with tokens 156. Transaction data records 506 may include details regarding the reasons for declining a token transaction. TM server 106 may utilize this information to generate notification/alert messages to transmit to a user.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for generating a secure payment token for use at a physical merchant location using a token storage device, such as token storage device 102 (shown in FIG. 1). In this example, the server (e.g., computing device) may include a memory device and a processor in communication with the memory device, and when executed by said processor the computer-executable instructions may cause the processor to generate a secure payment token in response to receiving a token request from a user computing device, and transmit the secure payment token to the user computing device, thereby instructing the user computing device to transfer the secure payment token onto a token storage device for use at a physical merchant location, as illustrated in FIGS. 1-3.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A token management computing system for provisioning a secure payment token to a token storage device for a payment transaction, the token management computing system comprising a token management ("TM") server, wherein the token storage device is controlled by a user and comprises a physical device shaped like a payment card and including an embedded EMV microchip, the embedded EMV microchip configured to communicate the payment token to a merchant point-of-sale terminal, the TM server comprising:
a memory device for storing data; and
at least one processor communicatively coupled to the memory device, the at least one processor programmed to:
receive, from an application executing on a user computing device separate from the token storage device, a token request for a single-use payment token, the token request including (i) a payment account number (PAN) selected from a digital wallet stored on the user computing device, (ii) at least one token control, wherein the at least one token control includes an amount of value associated with the token request and one or more allowed merchant categories, and (iii) at least one of a device identifier associated with the user computing device or a user identifier registered with the application;
generate, upon receiving the token request, the single-use payment token;
store token information in a database, wherein the token information links the generated single-use payment token, the PAN, the at least one token control, and a user profile including the at least one of the device identifier or the user identifier; and
transmit, in response to the token request, a token response message to the application executing on the user computing device, wherein the token response message includes (i) the generated single-use payment token and (ii) instructions that cause the application executing on the user computing device to automatically transfer the generated single-use payment token to the embedded EMV microchip of the token storage device for use at a physical merchant location by dipping the token storage device in a chip reader slot of the merchant point-of-sale terminal where the embedded EMV microchip is configured to transfer the generated single-use payment token from the token storage device to the chip reader of the merchant point-of-sale terminal, wherein the transfer of the generated single-use token is performed wirelessly, and wherein the token storage device does not include a magnetic stripe with user information.

2. The token management computing system of claim 1, wherein the at least one processor is further programmed to generate the single-use payment token by (i) generating a temporary PAN associated with the PAN received in the token request, (ii) tokenizing the temporary PAN for a single transaction, and (iii) linking the tokenized temporary PAN with the received PAN in the database.

3. The token management computing system of claim 1, wherein the token storage device is configured to receive a plurality of single-use payment tokens from the user computing device.

4. The token management computing system of claim 1, wherein the token storage device is further configured to encrypt the generated single-use payment token.

5. The token management computing system of claim 1, wherein the at least one token control further includes a merchant category for which the single-us payment token is ineligible for use as payment.

6. The token management computing system of claim 1, wherein the payment transaction is authorized over a payment processing network, and wherein the at least one processor is further programmed to:
receive, from the payment card processing network, an authorization request message for the payment transaction, the authorization request message including the generated single-use payment token;
retrieve the token information from the database;
identify, using the retrieved token information, the PAN corresponding to the generated single-use payment token; and
replace the generated single-use payment token in the authorization request message with the identified PAN to generate an updated authorization request message.

7. The token management computing system of claim 1, wherein the token storage device is further configured to communicate the single-use payment token to the merchant point-of-sale terminal using near field communication (NFC).

8. The token management computing system of claim 1, wherein the at least one processor is further programmed to:
receive, from the payment card processing network, an authorization request message for the payment transaction, the authorization request message including transaction data and the generated single-use payment token;
retrieve, from the database, the at least one token control associated with the generated single-use payment token; and
apply the at least one token control to the transaction data included in the authorization request message to determine whether to proceed with authorization or deny authorization and decline the payment transaction.

9. The token management computing system of claim 8, wherein the at least one processor is further programmed to deny authorization and decline the payment transaction if a total purchase amount associated with the payment transaction exceeds the amount of value established by the at least one token control.

10. The token management computing system of claim 1, wherein the at least one processor is further programmed to:
set an expiration date for the single-use payment token; and
prevent the use of the single-use payment token based on the expiration date.

11. The token management computing system of claim 1, wherein the at least one processor is further programmed to:
subsequent to transmitting the token response message to the application executing on the user computing device, request a second token request for a second single-use payment token;
generate, upon receiving the second token request, the second single-use payment token; and
transmit, in response to the second token request, a second token response message to the application executing on the user computing device, wherein the second token response message includes the second generated single-use payment token.

12. A computer-implemented method for provisioning a secure payment token to a token storage device for a payment transaction using a token management computing system comprising a token management ("TM") server comprising at least one processor communicatively coupled to a memory device, wherein the token storage device is controlled by a user and comprises a physical device shaped like a payment card and including an embedded EMV microchip, the embedded EMV microchip configured to communicate the payment token to a merchant point-of-sale terminal, the method comprising:

receiving, from an application executing on a user computing device separate from the token storage device, at the TM server, a token request for a single-use payment token, the token request including (i) a payment account number (PAN) selected from a digital wallet stored on the user computing device, (ii) at least one token control, wherein the at least one token control includes an amount of value associated with the token request and one or more allowed merchant chains, and (iii) at least one of a device identifier associated with the user computing device or a user identifier registered with the application;

generating, at the TM server, upon receiving the token request, the single-use payment token;

storing token information in a database, wherein the token information links the generated single-use payment token, the PAN, the at least one token control, and a user profile including the at least one of the device identifier or the user identifier; and transmitting, by the TM server in response to the token request, a token response message to the application executing on the user computing device, wherein the token response message includes (i) the generated single-use payment token and (ii) instructions that cause the application executing on the user computing device to automatically transfer the generated single-use payment token to the embedded microchip of the token storage device for use at a physical merchant location by dipping the token storage device in a chip reader slot of the merchant point-of-sale terminal where the embedded EMV microchip is configured to transfer the generated single-use payment token from the token storage device to the chip reader of the merchant point-of-sale terminal, wherein the transfer of the generated single-use token is performed wirelessly, and wherein the token storage device does not include a magnetic stripe with user information.

13. The computer-implemented method of claim 12, further comprising generating the single-use payment token by (i) generating a temporary PAN associated with the PAN received in the token request, (ii) tokenizing the temporary PAN for a single transaction, and (iii) linking the tokenized temporary PAN with the received PAN in the database.

14. The computer-implemented method of claim 12, wherein the at least one token control further includes a merchant category for which the single-use payment token is ineligible for use as payment.

15. The computer-implemented method of claim 12, wherein the payment transaction is authorized over a payment processing network, and wherein the computer-implemented method further comprises:

receiving, from the payment card processing network, an authorization request message for the payment transaction, the authorization request message including the generated single-use payment token;

retrieving the token information from the database;

identifying, using the retrieved token information, the PAN corresponding to the generated single-use payment token; and replacing, by the TM server, the generated single-use payment token in the authorization request message with the identified PAN to generate an updated authorization request message.

16. The computer-implemented method of claim 12, further comprising:

receiving, from the payment card processing network, an authorization request message for the payment transaction, the authorization request message including transaction data and the generated single-use payment token;

retrieving, from the database, the at least one token control associated with the generated single-use payment token; and applying, by the TM server, the at least one token control to the transaction data included in the authorization request message to determine whether to proceed with authorization or deny authorization and decline the payment transaction.

17. At least one non-transitory computer-readable storage media that includes computer-executable instructions for provisioning a secure payment token to a token storage device for a payment transaction using a token management computing system comprising a token management ("TM") server, wherein the token storage device is controlled by a user and comprises a physical device shaped like a payment card and including an embedded EMV microchip, the embedded EMV microchip configured to communicate the payment token to a merchant point-of-sale terminal, wherein when executed by the TM server, the computer-executable instructions cause the TM server to:

receive, from an application executing on a user computing device separate from the token storage device, a token request for a single-use payment token, the token request including (i) a payment account number (PAN) selected from a digital wallet stored on the user computing device, (ii) at least one token control, wherein the at least one token control includes an amount of value associated with the token request and a plurality of merchants associated with a specific address, and (iii) at least one of a device identifier associated with the user computing device or a user identifier registered with the application;

generate, upon receiving the token request, the single-use payment token;

store token information in a database, wherein the token information links the generated single-use payment token, the PAN, the at least one token control, and a user profile including the at least one of the device identifier or the user identifier; and transmit, in response to the token request, a token response message to the application executing on the user computing device, wherein the token response message includes (i) the generated single-use payment token and (ii) instructions that cause the application executing on the user computing device to automatically transfer the generated single-use payment token to the embedded microchip of the token storage device for use at a physical merchant location by dipping the token storage device in a chip reader slot of the merchant point-of-sale terminal where the embedded EMV microchip is configured to transfer the generated single-use payment token from the token storage device to the chip reader of the merchant point-of-sale terminal, wherein the transfer of the generated single-use token is performed wirelessly, and wherein the token storage device does not include a magnetic stripe with user information.

18. The at least one non-transitory computer-readable storage media of claim 17, wherein the computer-executable instructions further cause the TM server to generate the single-use payment token by (i) generating a temporary PAN associated with the PAN received in the token request, (ii) tokenizing the temporary PAN for a single transaction, and (iii) linking the tokenized temporary PAN with the received PAN in the database.

19. The at least one non-transitory computer-readable storage media of claim 17, wherein the payment transaction is authorized over a payment processing network, and wherein the computer-executable instructions further cause the TM server to:
   receive, from the payment card processing network, an authorization request message for the payment transaction, the authorization request message including the generated single-use payment token;
   retrieve the token information from the database;
   identify, using the retrieved token information, the PAN corresponding to the generated single-use payment token; and
   replace the generated single-use payment token in the authorization request message with the identified PAN to generate an updated authorization request message.

20. The at least one non-transitory computer-readable storage media of claim 17, wherein the computer-executable instructions further cause the TM server to:
   receive, from the payment card processing network, an authorization request message for the payment transaction, the authorization request message including transaction data and the generated single-use payment token;
   retrieve, from the database, the at least one token control associated with the generated single-use payment token; and
   apply the at least one token control to the transaction data included in the authorization request message to determine whether to proceed with authorization or deny authorization and decline the payment transaction.

\* \* \* \* \*